(12) United States Patent
Hirasawa et al.

(10) Patent No.: US 8,999,664 B2
(45) Date of Patent: Apr. 7, 2015

(54) METHOD OF IMPROVING SALMON MEAT COLOR

(75) Inventors: Kazuaki Hirasawa, Yokohama (JP); Akira Tsubokura, Yokohama (JP); Hisashi Yoneda, Yokohama (JP)

(73) Assignee: JX Nippon Oil & Energy Corporation, Tokyo (JP)

(*) Notice: Subject to any disclaimer, the term of this patent is extended or adjusted under 35 U.S.C. 154(b) by 468 days.

(21) Appl. No.: 12/445,615

(22) PCT Filed: Sep. 14, 2007

(86) PCT No.: PCT/JP2007/068490
§ 371 (c)(1),
(2), (4) Date: Apr. 15, 2009

(87) PCT Pub. No.: WO2008/047535
PCT Pub. Date: Apr. 24, 2008

(65) Prior Publication Data
US 2010/0319077 A1    Dec. 16, 2010

(30) Foreign Application Priority Data
Oct. 17, 2006    (JP) ................................. 2006-282085

(51) Int. Cl.
| C12P 23/00 | (2006.01) |
| A23K 1/16 | (2006.01) |
| A23K 1/18 | (2006.01) |
| A23L 1/325 | (2006.01) |

(52) U.S. Cl.
CPC ............. *A23K 1/1606* (2013.01); *A23K 1/1603* (2013.01); *A23K 1/188* (2013.01); *A23L 1/325* (2013.01)

(58) Field of Classification Search
CPC ... A23K 1/0016; A23K 1/1606; A23K 1/188; A23L 11/00
USPC ........................................ 435/67, 252.1, 244
See application file for complete search history.

(56) References Cited

U.S. PATENT DOCUMENTS

| 4,871,551 A | 10/1989 | Spencer |
| 6,706,278 B1 | 3/2004 | Tsubokura et al. |
| 2003/0044886 A1 | 3/2003 | Tsubokura et al. |
| 2006/0121556 A1 | 6/2006 | Hirasawa et al. |
| 2006/0234333 A1 | 10/2006 | Matuschek |
| 2009/0221026 A1 | 9/2009 | Tanaka et al. |
| 2009/0226582 A1 | 9/2009 | Ide et al. |

FOREIGN PATENT DOCUMENTS

| CL | 00724-2003 | 2/2004 |
| CL | 02880-2006 | 5/2007 |
| CL | 02881-2006 | 5/2007 |
| CL | 03256-2006 | 6/2007 |
| DE | 10238978 A1 | 3/2004 |
| DE | 10300649 A1 | 7/2004 |
| EP | 2087795 A1 | 9/2007 |
| EP | 1956077 A1 | 8/2008 |
| JP | 1996508885 | 9/1996 |
| JP | 09-308481 A | 12/1997 |
| JP | 2001095500 | 4/2001 |
| JP | 2001-352995 A | 12/2001 |
| JP | 200527622 | 2/2005 |
| JP | 2006-101721 A | 4/2006 |
| JP | 2007-244206 A | 9/2007 |
| WO | WO-9423594 | 10/1994 |
| WO | WO-01/96591 A1 | 12/2001 |
| WO | WO2004063359 A2 | 7/2004 |
| WO | WO-2006/038542 A1 | 4/2006 |

OTHER PUBLICATIONS

Akira et al. JP 9308481 Dec. 2, 1997 pp. 1-18.*
Samuel P. Meyers, Developments in World Aquaculture, Feed Formulations, and Role of Carotenoids, Pure & Appl. Chem., vol. 66, No. 5, 1994, pp. 1069-1076, Great Britain.
Higuera-Ciapara et al., "Astaxanthin: A Review of its Chemistry and Applications", Critical Reviews in Food Science and Nutrition, 46: 185-196 (2006).
JPO Office Action for JPA No. 2006-282085—issued on Jan. 31, 2012.
Japanese Laid-Open Publication No. H09-308481—Published Dec. 2, 1997—cited in JPO Office Action for JPA No. 2006-282085—issued on Jan. 31, 2012.
Ole J. Torrissen et al., Reviews in Aquatic Sciences, vol. 1, Issue 2; published in 1989; pp. 209-225; Pigmentation of Salmonids—Carotenoid Deposition and Metabolism.
Supplemental European Search Report, mailed Jan. 25, 2010 for EP 07807812.8; EP 07807812.8 is the E.P. counterpart application to the instant application U.S. Appl. No. 12/445,615 (See EP 2087795, SUPRA).
An Office Action, mailed Dec. 18, 2012, which issued during the prosecution of Japanese Patent Application No. 2006-282085, which corresponds to the present application.

* cited by examiner

Primary Examiner — Maria Leavitt
(74) Attorney, Agent, or Firm — McDermott Will & Emery LLP

(57) ABSTRACT

The present invention provides a salmon flesh color improving method and a salmon flesh color improving feed which are usable for producing a salmon having a mild reddish orange flesh color close to the flesh color of wild fish, and a salmon and fish flesh thereof produced by such a flesh color improving method. The present invention also provides a method for producing a salmon having a mild reddish orange flesh color, comprising cultivating the salmon with a feed comprising a carotenoid colorant mixed therein, the carotenoid colorant comprising at least astaxanthin, phoenicoxanthin, canthaxanthin and adonixanthin.

11 Claims, No Drawings

METHOD OF IMPROVING SALMON MEAT COLOR

CROSS-REFERENCE TO PRIOR APPLICATION

This is the U.S. National Phase Application under 35 U.S.C. §371 of International Patent Application No. PCT/JP2007/068490 filed Sep. 14, 2007, which claims the benefit of Japanese Patent Application No. 2006-282085 filed Oct. 17, 2006, both of them are incorporated by reference herein. The International Application was published in Japanese on Apr. 24, 2008 as WO2008/047535 A1 under pct article 21(2).

TECHNICAL FIELD

The present invention relates to a salmon flesh color improving method and a salmon flesh color improving feed which are usable for producing a salmon, i.e., a fish of the salmon family, having a mild reddish orange flesh color close to the flesh color of wild fish, and also a salmon and flesh thereof produced by such a flesh color improving method.

BACKGROUND ART

Wild salmons take and accumulate a carotenoid colorant contained in shrimps, prawns, lobsters, or crabs in the natural world, and thus the flesh of the wild salmons exhibits a reddish orange color. Cultivated salmons are usually cultivated with a feed supplemented with a carotenoid colorant in order to allow the flesh thereof to exhibit a color close to that of wild salmons.

As the carotenoid colorant to be supplemented to the feed, a chemically synthesized astaxanthin is conventionally in a wide use (Critical Reviews in Food Science and Nutrition, 46: 185-196 (2006)). Known examples of a naturally occurring carotenoid colorant used for improving the flesh color of salmons include astaxanthin produced by *Phaffia rhodozyma* (PCT National-Phase Japanese Laid-Open Patent Publication No. 8-508885), astaxanthin produced by alga *Haematococcus pluvialis* (U.S. Pat. No. 4,871,551), and capsaicin, which is a component of red pepper (Japanese Laid-Open Patent Publication No. 2005-27662). Although not for salmons, it is known to use a carotenoid colorant produced by bacteria *Paracoccus carotinifaciens* E-396 strain (FERM BP-4283) for testing the color tone improvement on the surface of red sea bream (Japanese Laid-Open Patent Publication No. 9-308481). A substance containing a colorant to be supplemented to the feed, which is formed of a precipitate obtained as a result of microorganism culturing, the precipitate containing a carotenoid compound, is also known (Japanese Laid-Open Patent Publication No. 2001-95500).

DISCLOSURE OF THE INVENTION

The flesh of a salmon cultivated with a feed supplemented with a synthetic astaxanthin exhibits a bright red color, but the red color is occasionally too strong. There is a concern that such an extremely bright color, when being associated with the knowledge that the colorant is chemically synthesized, may give an unfavorable impression to consumers. The carotenoid colorants produced by *Phaffia rhodozyma* and alga *Haematococcus pluvialis* are promising in being likely to be accepted by consumers having a preference for nature oriented food. However, the carotenoid colorants derived from such yeast and alga are mostly formed of astaxanthin, and the color tone of the fish flesh realized by such carotenoid colorants is similar to that realized by a synthetic astaxanthin. As a source of a red colorant, red pepper is useful. However, the production of red pepper, which is a natural product, depends on the climate, and it is difficult to provide such a colorant stably.

Under such circumstances, a method for cultivating and producing a salmon having a natural looking reddish orange flesh color by incorporating a stably providable, naturally occurring colorant into a feed has been required.

MEANS FOR SOLVING THE PROBLEMS

In order to solve the above-described problems, the present inventors found that by providing a feed containing a carotenoid colorant which contains astaxanthin, phoenicoxanthin (also referred to as "adonirubin"), canthaxanthin and adonixanthin, a salmon having a milder and more natural looking reddish orange flesh color can be produced than a salmon cultivated with a synthetic astaxanthin; and completed the present invention.

The present invention provides the following method, feed and salmon.

(1) A method for producing a salmon having a mild reddish orange flesh color, comprising cultivating the salmon with a feed comprising a carotenoid colorant mixed therein, the carotenoid colorant comprising at least astaxanthin, phoenicoxanthin, canthaxanthin and adonixanthin, wherein a content of astaxanthin in the feed is 20 to 100 mg/kg and a content of phoenicoxanthin in the feed is 5 to 80 mg/kg.

(2) The method according to (1), wherein a content of canthaxanthin in the feed is 0.5 to 25 mg/kg.

(3) The method according to (1) or (2), wherein a content of adonixanthin in the feed is 0.2 to 40 mg/kg.

(4) The method according to any one of (1) to (3), wherein the produced salmon contains astaxanthin and phoenicoxanthin in fish flesh thereof.

(5) The method according to (4), wherein the produced salmon contains canthaxanthin and/or adonixanthin in the fish flesh thereof.

(6) The method according to (4) or (5), wherein a ratio of the content of phoenicoxanthin with respect to the content of astaxanthin in the fish flesh of the produced salmon is 5 to 80%.

(7) The method according to any one of (4) to (6), wherein a ratio of the content of canthaxanthin with respect to the content of astaxanthin in the fish flesh of the produced salmon is 0.5 to 20%.

(8) The method according to any one of (4) to (7), wherein a ratio of the content of adonixanthin with respect to the content of astaxanthin in the fish flesh of the produced salmon is 0.2 to 40%.

(9) The method according to any one of (1) to (8), wherein the carotenoid colorant in the feed comprises a naturally occurring carotenoid colorant.

(10) The method according to any one of (1) to (8), wherein the carotenoid colorant in the feed comprises a naturally occurring carotenoid colorant and a chemically synthesized carotenoid colorant.

(11) The method according to (9) or (10), wherein the naturally occurring carotenoid colorant included in the carotenoid colorant is produced by fermentation of bacteria.

(12) The method according to (11), wherein the bacteria belong to the *Paracoccus* genus.

(13) The method according to (11), wherein the bacteria contain a DNA corresponding to 16S ribosomal RNA, the DNA containing a base sequence which is at least 98% homologous to the base sequence represented by SEQ ID NO: 1.

(14) The method according to (13), wherein the bacteria are E-396 strain (FERM BP-4283) or a mutant thereof

(15) The method according to any one of (1) to (14), wherein the salmon is at least one selected from the group consisting of *Salmo salar, Oncorhynchus mykiss, Oncorhynchus kisutch, Oncorhynchus tshawytscha, Oncorhynchus nerka, Oncorhynchus gorbuscha, Oncorhynchus masou, Oncorhynchus keta, Oncorhynchus masou macrostomus*, and *Salmo trutta*.

(16) The method according to (15), wherein the salmon is at least one selected from the group consisting of *Salmo salar, Oncorhynchus mykiss, Oncorhynchus kisutch*, and *Oncorhynchus tshawytscha*.

(17) A feed for producing a salmon in any one of (1) to (16).

(18) A feed for cultivating a salmon, comprising a carotenoid colorant mixed therein, the carotenoid colorant comprising at least astaxanthin, phoenicoxanthin, canthaxanthin and adonixanthin.

(19) The feed according to (18), wherein a content of astaxanthin in the feed is 20 to 100 mg/kg and a content of phoenicoxanthin in the feed is 5 to 80 mg/kg.

(20) The feed according to (18) or (19), wherein a content of canthaxanthin in the feed is 0.5 to 25 mg/kg.

(21) The feed according to any one of (18) to (20), wherein a content of adonixanthin in the feed is 0.2 to 40 mg/kg.

(22) A salmon, fish flesh thereof, or an egg thereof, wherein the salmon is produced by the method according to any one of (1) to (16).

(23) The salmon, the fish flesh thereof, or the egg thereof according to (22), wherein a ratio of the content of phoenicoxanthin with respect to the content of astaxanthin in the fish flesh or the egg of the salmon is 5 to 80%.

(24) The salmon, the fish flesh thereof, or the egg thereof according to (22) or (23), wherein a ratio of the content of canthaxanthin with respect to the content of astaxanthin in the fish flesh or the egg of the salmon is 0.5 to 20%.

(25) The salmon, the fish flesh thereof, or the egg thereof according to any one of (22) to (24), wherein a ratio of the content of adonixanthin with respect to the content of astaxanthin in the fish flesh or the egg of the salmon is 0.2 to 40%.

EFFECT OF THE INVENTION

The present invention provides a feed including a carotenoid colorant which includes at least astaxanthin, phoenicoxanthin, canthaxanthin and adonixanthin. By cultivating with the feed according to the present invention, a salmon having a mild and natural looking reddish orange flesh color can be produced.

BEST MODE FOR CARRYING OUT THE INVENTION

Hereinafter, embodiments of the present invention will be described. The following embodiments are merely illustrative of the present invention, and are not intended to limit the present invention in any way. The present invention can be carried out in various embodiments without departing from the spirit thereof.

All the publications cited herein, including the prior art documents, laid-open patent publications, patent publications, and other patent-related documents, are incorporated herein in their entirety for reference. This specification incorporates the contents of Japanese Patent Application No. 2006-282085, upon which the present application claims the benefit of priority.

Now, the present invention will be described in detail.

The present invention relates to a feed for salmons which includes a carotenoid colorant including at least astaxanthin, phoenicoxanthin, canthaxanthin and adonixanthin, and which is usable for producing a salmon having a mild reddish orange flesh color. The present invention also relates to a method for cultivating and producing a salmon having a mild reddish orange flesh color using such a feed.

In the present invention, the term "salmon" refers to a type of fish belonging to the *Oncorhynchus* genus of the salmon family or the *Salmo* genus of the salmon family. The salmons belonging to the *Oncorhynchus* genus include, for example, rainbow trout (*Oncorhynchus mykiss*), silver salmon (*Oncorhynchus kisutch*), king salmon (*Oncorhynchus tshawytscha*), red salmon (*Oncorhynchus nerka*), pink salmon (*Oncorhynchus gorbuscha*), chum salmon (*Oncorhynchus keta*), cherry salmon (*Oncorhynchus masou*), and red spotted trout (*Oncorhynchus masou macrostomus*). The salmons belonging to the Salmo genus include, for example, Atlantic salmon (*Salmo salar*) and brown trout (*Salmo trutta*). Among these salmons, *Salmo salar, Oncorhynchus mykiss, Oncorhynchus kisutch*, and *Oncorhynchus tshawytscha* are preferable for the present invention. The salmon according to the present invention may be of the sea-run form used for mariculture or of the landlocked form used for fresh-water culture, with no specific limitation on the form of cultivation.

According to the present invention, a naturally occurring carotenoid colorant is preferably used, but a naturally occurring carotenoid colorant may be mixed with a chemically synthesized carotenoid colorant. There is no specific limitation on the feed according to the present invention as long as the feed contains at least naturally occurring astaxanthin, phoenicoxanthin, canthaxanthin and adonixanthin. For example, a carotenoid colorant produced by bacteria, yeast or alga, a plant derived carotenoid colorant, or a carotenoid obtained from a crustacean such as shrimp, prawn, lobster or crab may be used independently or in a combination of two or more. A preferable naturally occurring carotenoid colorant is produced by fermentation of bacteria.

A bacteria derived carotenoid colorant is preferable in being effectively usable owing to the thin cell wall. A carotenoid colorant derived from bacteria belonging to the *Paracoccus* genus is preferable in being highly productive. It is also preferable to use a colorant derived from bacteria containing a DNA corresponding to 16S ribosomal RNA, the DNA containing a base sequence substantially homologous to the base sequence represented by SEQ ID NO: 1.

Herein, the phrase "substantially homologous" means having homology of 98% or higher, with the error frequency for determining the base sequence of DNA or the like being considered. It is especially preferable to use, for example, a carotenoid colorant derived from the *Paracoccus carotinifaciens* E-396 strain (FERM BP-4283) or a mutant thereof.

The E-396 strain is deposited as international deposition to the International Patent Organism Depositary, National Institute of Advanced Industrial Science and Technology as follows.

International Deposition Authority: International Patent Organism Depositary, National Institute of Advanced Industrial Science and Technology (former National Institute of Bioscience and Human-Technology, Agency of Science and Technology, Ministry of International Trade and Industry)

Central 6, Higashi 1-1-1, Tsukuba-shi, Ibaraki-ken, 305-8566

Identification No.: E-396

Deposition No.: FERM BP-4283

Date of original deposition: Apr. 27, 1993

There is no specific limitation on the method for producing a mutant as long as the method induces mutation. For example, a chemical method using a mutating agent such as N-methyl-N'-nitro-N-nitrosoguanidine (NTG), ethylmethanesulfonate (EMS) or the like; a physical method using ultraviolet radiation, x-ray radiation or the like; or a biological method using gene recombination, transposon or the like may be used. The mutation may be performed in one stage, or at least two stages. In the latter case, for example, a mutant of an astaxanthin-producing microorganism is obtained in a first stage, and then the obtained mutant is further subjected to another mutation process.

A naturally occurring carotenoid colorant to be incorporated into the feed according to the present invention may be used in an original form thereof, or may be used in powder obtained by drying the colorant together with the organism. The "powder obtained by drying the colorant together with the organism" may be obtained by, for example, drying a colorant obtained by culturing a colorant-producing microorganism and a culture solution containing the microorganism as they are, or by drying and powderizing a plant inherently containing a colorant. An organism or a culture solution containing a carotenoid colorant may be dried and powderized as it is; a colorant may be extracted therefrom using an organic solvent or the like; or the extract may be further separated and purified to have a higher level of purity.

There is no specific form of the feed according to the present invention as long as the feed contains astaxanthin, phoenicoxanthin, canthaxanthin and adonixanthin. Examples of the form of the feed include pellet, powder, kneaded feed, and further include extrusion-molded pellet, moist pellet, mash and the like. The size of the feed may be changed in several stages as the salmon grows, with no specific limitation. Components other than the carotenoid colorant may be used as additives. For example, the main component of the feed, such as fish flesh powder or the like, may be supplemented with an additive such as flour, soybean oil sediment, corn gluten meal, vitamins, minerals, fish oil or the like. There is no specific limitation on the type or amount of these additives as long as a type of additive generally used for cultivating salmons is used in a generally used amount. A carotenoid colorant may be added in consideration of thermal deactivation which occurs during feed production. In the case of an extrusion-molded pellet, the carotenoid colorant may be added before or after the extrusion molding.

There is no specific limitation on the amount of astaxanthin, phoenicoxanthin, canthaxanthin and adonixanthin to be incorporated into the feed according to the present invention. For example, in order to produce a salmon having a mild reddish orange flesh color, the content of astaxanthin in the feed is adjusted to be preferably at least 20 mg/kg, more preferably at least 30 mg/kg, further preferably at least 40 mg/kg, and preferably at most 100 mg/kg, more preferably at most 90 mg/kg, and further preferably at most 80 mg/kg.

In order to provide a reddish orange color to the fish flesh, the content of phoenicoxanthin in the feed is preferably at least 5 mg/kg, more preferably at least 10 mg/kg, further preferably at least 15 mg/kg, and preferably at most 80 mg/kg, more preferably at most 70 mg/kg, and further preferably at most 60 mg/kg. Canthaxanthin and adonixanthin are effective to provide an orange color to the fish flesh. According to the present invention, it is preferable that the content of astaxanthin in the feed is 20 to 100 mg/kg and the content of phoenicoxanthin in the feed is 5 to 80 mg/kg.

The content of canthaxanthin in the feed is preferably at least 0.5 mg/kg, more preferably at least 1.0 mg/kg, further preferably at least 1.5 mg/kg, and preferably at most 25 mg/kg, more preferably at most 20 mg/kg, and further preferably at most 15 mg/kg. The content of adonixanthin in the feed is preferably at least 0.2 mg/kg, more preferably at least 1.0 mg/kg, further preferably at least 2.0 mg/kg, and preferably at most 40 mg/kg, more preferably at most 30 mg/kg, and further preferably at most 20 mg/kg.

There is no specific limitation on the method for cultivating a salmon according to the present invention. According to an exemplary method, a fry which is cultivated to have a weight of about 100 to 300 g in fresh water is released to a marine fish pen, and fed once a day in satiation until the fish grows to a size suitable for shipping. The feed according to the present invention is preferably used during the entire period of fish cultivating in the marine fish pen, but may be used in a part of the period with another feed being used for the rest of the period. The feed according to the present invention may be used for cultivating the fish in fresh water. The method according to the present invention is also usable to cultivate a salmon of the landlocked form in fresh water.

The flesh color of a landed salmon can be quantified with the L*a*b* color system by measuring the color using a spectrometer. L* represents the luminance, a* represents the chroma red, and b* represents chroma yellow. A higher value of a*/b* represents a color more reddish than orangish, and a lower value of a*/b* represents a color more orangish than reddish. The flesh color of a salmon produced by a method according to the present invention tends to have a smaller a*/b* value and thus exhibits a more natural looking reddish orange color than the salmon cultivated with a feed supplemented with a synthetic astaxanthin.

According to another, indirect method for quantifying the flesh color of a salmon, a carotenoid colorant in the fish flesh is extracted and analyzed. The carotenoid colorant has a different color tone depending on the compounds included therein. The four carotenoid compounds usable for the present invention can be ordered as astaxanthin, phoenicoxanthin, canthaxanthin and adonixanthin from the one having the highest level of chroma red to the one having the highest level of chroma orange. By analyzing the content of each of these compounds of the carotenoid colorant in the fish flesh, the flesh color can be estimated.

The fish flesh of a salmon produced by a method according to the present invention preferably contains astaxanthin and phoenicoxanthin. The fish flesh of a salmon produced by a method according to the present invention preferably contains either or both of canthaxanthin and adonixanthin in addition to astaxanthin and phoenicoxanthin. Herein, the phrase "fish flesh" refers to the flesh of fish generally eaten by humans, and encompasses both fresh flesh and processed flesh. Examples of the processed flesh include sliced fish, dry fish, smoke salmon, salted salmon, slightly salted salmon, canned fish and the like. An egg of a salmon produced by a method according to the present invention also exhibits a mild reddish orange color and thus is industrially useful.

The ratio of the content of phoenicoxanthin with respect to the content of astaxanthin in the fish flesh or egg is preferably at least 5%, more preferably at least 10%, further preferably at least 15%, and preferably at most 80%, more preferably at most 70%, further preferably at most 60%. The ratio of the content of canthaxanthin with respect to the content of astaxanthin in the fish flesh or egg is preferably at least 0.5%, more preferably at least 1%, further preferably at least 1.5%, and preferably at most 20%, more preferably at most 15%, further preferably at most 10%. The ratio of the content of adonixanthin with respect to the content of astaxanthin in the fish flesh or egg is preferably at least 0.2%, more preferably at least 1.0%, further preferably at least 2.0%, and preferably at most 40%, more preferably at most 30%, further preferably at most 20%.

EXAMPLES

Hereinafter, the present invention will be described in more detail by way of examples. The present invention is not intended to limit to these examples.

In the examples, the quantification of the carotenoid colorant was performed using high performance liquid chromatography (HPLC). Two columns of Wakosil-II 5 SIL-100 φ4.6×250 mm (produced by Wako Pure Chemical Industries, Ltd.) were connected to each other. An n-hexane:tetrahydrofuran:methanol (40:20:1) mixed solution was used as a mobile phase. A constant room temperature and a flow rate of 1.0 ml/min were used. The detection was performed at a wavelength of 470 nm. The feed or fish flesh was milled, and then the colorant was extracted with a tetrahydrofuran:methanol (20:1) mixed solution. The colorant was appropriately diluted with the mobile phase and analyzed by HPLC.

Example 1

100 ml of a medium having the composition shown in Table 1 was put into a 500 mL flask with a cotton plug and heated at 121° C. for 15 minutes to be sterilized. One platinum loop of the *Paracoccus carotinifaciens* E-396 strain (FERM BP-4283) was inoculated thereto, and was subjected to shaking culturing at 28° C. for 2 days.

The entire amount of the resultant culture solution was put into a 50 L fermentation tank containing 30 L of a medium having the composition shown in Table 1, and was subjected to stirring culturing at 28° C. for 1 day with stirring at 200 rpm. Then, 10 L of the resultant culture solution was put into a 600 L fermentation tank containing 300 L of a medium having the composition shown in Table 2, and the strain was cultured at 28° C. at a volume of air of 1.0 vvm for 120 hours, while the stirring rotation rate was automatically controlled to maintain the concentration of dissolved oxygen at 2.5 ppm at the minimum and also while the pH value was automatically controlled at 7.1 or greater with caustic soda. Sucrose, which is consumed as the strain grows, was added by 4.5 kg on each of the first day and the second day of culturing. A concentrate obtained by continuously treating the culture solution by a centrifuger was dried by a spray dryer to obtain a fermented product containing a carotenoid colorant. The fermented product was mixed with fish powder and the like and then pelletized, and coated with fish oil to prepare a feed for salmon. For comparison, a feed containing a commercially available synthetic astaxanthin was prepared. Table 3 shows the composition of the carotenoid colorant found by analyzing each feed using high performance liquid chromatography (HPLC).

300 silver salmons (*Oncorhynchus kisutch*) each weighing about 200 g were cultivated as a test division of being fed with the above-described fermented product, and another 300 silver salmons each weighing about 200 g were cultivated as a test division of being fed with the above-described synthetic product. The salmons were fed in satiation in a marine fish pen for 6 months. After the 6 months of cultivating, 10 fish of each test division were weighed. Table 4 shows the average value of the 10 fish of each test division. The fish were immediately killed by cutting medulla and frozen for preservation. After being thawed, the fish flesh was milled by a coffee mill, and a part thereof was put into a polyethylene bag to measure the color tone thereof by a spectrometer CM-508i (Minolta). Table 4 shows the average value of the 10 fish of each test division. From a part of the milled fish flesh, the carotenoid colorant was extracted, and analyzed in terms of the content of each carotenoid compound by HPLC. Table 5 shows the average value of the 10 fish of each test division.

The fish flesh of the synthesized product division exhibited an unnatural red color, whereas the fish flesh of the fermented product division exhibited a mild reddish orange color.

TABLE 1

| Composition | Amount g/L |
|---|---|
| Corn steep liquor | 10 |
| Sucrose | 50 |
| $KH_2PO_4$ | 1.5 |
| $Na_2HPO_4 \cdot 12H_2O$ | 3.8 |
| $MgSO_4 \cdot 7H_2O$ | 0.5 |
| $FeSO_4 \cdot 7H_2O$ | 0.01 |
| $CaCl_2 \cdot 2H_2O$ | 0.01 |
| $Na_2CO_3$ | Amount to make the medium pH 7.1 |

TABLE 2

| Composition | Amount g/L |
|---|---|
| Corn steep liquor | 40 |
| Sucrose | 50 |
| $KH_2PO_4$ | 1.5 |
| $Na_2HPO_4 \cdot 12H_2O$ | 3.8 |
| $MgSO_4 \cdot 7H_2O$ | 0.5 |
| $FeSO_4 \cdot 7H_2O$ | 0.2 |
| $CaCl_2 \cdot 2H_2O$ | 1.0 |
| NaOH | Amount to make the medium pH 7.1 |

TABLE 3

| | Content in the feed (mg/kg) | |
|---|---|---|
| Carotenoid compound | Feed with fermented product | Feed with synthetic product |
| Astaxanthin | 43.2 | 44.3 |
| Phoenicoxanthin | 9.8 | 0.1 or less |
| Canthaxanthin | 1.6 | 0.1 or less |
| Adonixanthin | 12.8 | 0.1 or less |
| Asteroidenone | 2.2 | 0.1 or less |
| β-carotin | 2.3 | 0.1 or less |
| Equinenone | 2.0 | 0.1 or less |
| 3-hydroxyequinenone | 1.9 | 0.1 or less |

TABLE 4

| | Fermented product division | Synthetic product division |
|---|---|---|
| Fish weight (g) | 1,586 | 1,550 |
| Value by spectrometer analysis | | |
| L* value (luminance) | 56.7 | 55.6 |
| a* value (chroma red) | 25.3 | 26.0 |
| b* value (chroma yellow) | 26.8 | 26.2 |
| a*/b* | 0.94 | 0.99 |

TABLE 5

| Carotenoid compound | Fermented product division Content in fish flesh (mg/kg) | Fermented product division Ratio to astaxanthin (%) | Synthetic product division Content in fish flesh (mg/kg) |
|---|---|---|---|
| Astaxanthin | 10.4 | 100 | 12.7 |
| Phoenicoxanthin | 1.2 | 11.5 | 0.02 or less |
| Canthaxanthin | 0.1 | 1.0 | 0.02 or less |
| Adonixanthin | 2.4 | 23.1 | 0.02 or less |
| Asteroidenone | 0.2 | 1.9 | 0.02 or less |
| β-carotin | 0.02 or less | 0.2 or less | 0.02 or less |
| Equinenone | 0.02 or less | 0.2 or less | 0.02 or less |
| 3-hydroxyequinenone | 0.02 or less | 0.2 or less | 0.02 or less |

Example 2

The *Paracoccus carotinifaciens* E-396 strain (FERM BP-4283) was mutated with N-methyl-N'-nitro-N-nitrosoguanidine, and a dark red colony was selected. The carotenoid colorant in the culture solution of the strain was analyzed, and a mutant strain having an improved productivity of astaxanthin was selected. 100 ml of a medium having the composition shown in Table 1 was put into a 500 mL flask with a cotton plug and heated at 121° C. for 15 minutes to be sterilized. One platinum loop of the mutant strain was inoculated thereto, and was subjected to shaking culturing at 28° C. for 2 days.

The entire amount of the resultant culture solution was put into a 50 L fermentation tank containing 30 L of a medium having the composition shown in Table 1, and was subjected to stirring culturing at 28° C. for 1 day with stirring at 200 rpm. Then, 10 L of the resultant culture solution was put into a 600 L fermentation tank containing 300 L of a medium having the composition shown in Table 2, and the strain was cultured at 28.5° C. at a volume of air of 1.0 vvm for 120 hours, while the stirring rotation rate was automatically controlled to maintain the concentration of dissolved oxygen at 2.5 ppm at the minimum and also while the pH value was automatically controlled at 7.1 or greater with ammonia water. Sucrose, which is consumed as the strain grows, was added by 4.5 kg on each of the first day and the second day of culturing. A concentrate obtained by continuously treating the culture solution by a centrifuger was dried by a spray dryer to obtain a fermented product containing a carotenoid colorant. The fermented product was mixed with fish powder and the like and then pelletized, and coated with fish oil to prepare a feed for salmon. For comparison, a feed containing a commercially available synthetic astaxanthin was prepared. Table 6 shows the composition of the carotenoid colorant found by analyzing each feed using high performance liquid chromatography (HPLC).

50 rainbow trouts (*Oncorhynchus mykiss*) each weighing about 100 g were cultivated in a water tank as a test division of being fed with the above-described fermented product, and another 50 rainbow trouts each weighing about 100 g were cultivated in a water tank as a test division of being fed with the above-described synthetic product. The trouts of each test division were fed in satiation in fresh water for 3 months. After the 3 months of cultivating, 12 fish of each test division were weighed. Table 7 shows the average value of the 12 fish of each test division. The fish were immediately killed by cutting medulla. Table 7 shows the average value of the flesh color of the 12 fish of each test division measured by a spectrometer. After the measurement, the fish flesh was frozen for preservation. After being thawed, the fish flesh of the 12 fish of each test division was analyzed in terms of the content of each carotenoid compound. Table 8 shows the average value of the 12 fish of each test division.

The fish flesh of the synthesized product division exhibited a reddish orange color close to a red color, whereas the fish flesh of the fermented product division exhibited a mild and natural looking reddish orange color.

TABLE 6

| Carotenoid compound | Content in the feed (mg/kg) Feed with fermented product | Content in the feed (mg/kg) Feed with synthetic product |
|---|---|---|
| Astaxanthin | 63.2 | 64.6 |
| Phoenicoxanthin | 49.7 | 0.1 or less |
| Canthaxanthin | 15.6 | 0.1 or less |
| Adonixanthin | 2.1 | 0.1 or less |
| Asteroidenone | 1.3 | 0.1 or less |
| β-carotin | 7.1 | 0.1 or less |
| Equinenone | 6.0 | 0.1 or less |
| 3-hydroxyequinenone | 1.9 | 0.1 or less |

TABLE 7

| | Fermented product division | Synthetic product division |
|---|---|---|
| Fish weight (g) | 205 | 204 |
| Value by spectrometer analysis | | |
| L* value (luminance) | 41.6 | 41.8 |
| a* value (chroma red) | 8.6 | 9.1 |
| b* value (chroma yellow) | 14.9 | 13.8 |
| a*/b* | 0.58 | 0.66 |

TABLE 8

| Carotenoid compound | Fermented product division Content in fish flesh (mg/kg) | Fermented product division Ratio to astaxanthin (%) | Synthetic product division Content in fish flesh (mg/kg) |
|---|---|---|---|
| Astaxanthin | 3.4 | 100 | 6.3 |
| Phoenicoxanthin | 2.3 | 67.6 | 0.02 or less |
| Canthaxanthin | 0.4 | 11.8 | 0.02 or less |
| Adonixanthin | 0.1 | 2.9 | 0.02 or less |
| Asteroidenone | 0.1 | 2.9 | 0.02 or less |
| β-carotin | 0.02 or less | 0.6 or less | 0.02 or less |
| Equinenone | 0.02 or less | 0.6 or less | 0.02 or less |
| 3-hydroxyequinenone | 0.02 or less | 0.6 or less | 0.02 or less |

Example 3

A fermented product containing a carotenoid colorant was prepared in substantially the same method as in Example 2. The fermented product was mixed with fish powder and the like and then pelletized, and coated with fish oil to prepare a feed for salmon. For comparison, a feed containing a commercially available synthetic astaxanthin was prepared. Table 9 shows the composition of the carotenoid colorant found by analyzing each feed using high performance liquid chromatography (HPLC).

400 Atlantic salmons (*Salmo salar*) each weighing about 300 g were cultivated as a test division of being fed with the above-described fermented product, and another 400 Atlantic salmons each weighing about 300 g were cultivated as a test division of being fed with the above-described synthetic product. The salmons were fed in satiation in a marine fish pen for 12 months. After the 12 months of cultivating, 20 fish of each test division were landed and weighed. Table 10 shows the average value of the 20 fish of each test division. The fish were immediately killed by cutting medulla, and the fish flesh was measured in terms of the color tone by a spectrometer. Table 10 shows the average value of the 20 fish of each test division. After the measurement, the fish flesh was frozen for preservation for 1 month. After being thawed, the fish flesh of the 20 fish of each test division was analyzed in terms of the content of each carotenoid compound. Table 11 shows the average value of the 20 fish of each test division.

The fish flesh of the synthesized product division exhibited a reddish orange color with a high level of chroma red, whereas the fish flesh of the fermented product division exhibited a mild and natural looking reddish orange color.

TABLE 9

| | Content in the feed (mg/kg) | |
|---|---|---|
| Carotenoid compound | Feed with fermented product | Feed with synthetic product |
| Astaxanthin | 79.8 | 81.6 |
| Phoenicoxanthin | 47.3 | 0.1 or less |
| Canthaxanthin | 19.9 | 0.1 or less |
| Adonixanthin | 4.1 | 0.1 or less |
| Asteroidenone | 1.9 | 0.1 or less |
| β-carotin | 7.3 | 0.1 or less |
| Equinenone | 6.4 | 0.1 or less |
| 3-hydroxyequinenone | 2.3 | 0.1 or less |

TABLE 10

| | Fermented product division | Synthetic product division |
|---|---|---|
| Fish weight (g) | 5,112 | 5,097 |
| Value by spectrometer analysis | | |
| L* value (luminance) | 50.1 | 50.0 |
| a* value (chroma red) | 25.7 | 26.2 |
| b* value (chroma yellow) | 28.9 | 27.9 |
| a*/b* | 0.89 | 0.94 |

TABLE 11

| | Fermented product division | | Synthetic product division |
|---|---|---|---|
| Carotenoid compound | Content in fish flesh (mg/kg) | Ratio to astaxanthin (%) | Content in fish flesh (mg/kg) |
| Astaxanthin | 4.1 | 100 | 6.2 |
| Phoenicoxanthin | 1.7 | 41.5 | 0.02 or less |
| Canthaxanthin | 0.4 | 9.8 | 0.02 or less |
| Adonixanthin | 0.2 | 4.9 | 0.02 or less |
| Asteroidenone | 0.1 | 2.4 | 0.02 or less |
| β-carotin | 0.02 or less | 0.5 or less | 0.02 or less |
| Equinenone | 0.02 or less | 0.5 or less | 0.02 or less |
| 3-hydroxyequinenone | 0.02 or less | 0.5 or less | 0.02 or less |

Example 4

A fermented product containing a carotenoid colorant was prepared in substantially the same method as in Example 2. The fermented product was mixed with fish powder and the like and then pelletized, and coated with fish oil to prepare a feed for salmon. For comparison, a feed containing a commercially available synthetic astaxanthin was prepared. Table 12 shows the composition of the carotenoid colorant found by analyzing each feed using high performance liquid chromatography (HPLC).

100 king salmons (*Oncorhynchus tshawytscha*) each weighing about 200 g were cultivated as a test division of being fed with the above-described fermented product, and another 100 king salmons each weighing about 200 g were cultivated as a test division of being fed with the above-described synthetic product. The salmons were fed in satiation in a marine fish pen for 3 months. After the 3 months of cultivating, 15 fish of each test division were sampled and weighed. Table 13 shows the average value of the 15 fish of each test division. The fish were immediately killed by cutting medulla. Table 13 shows the average value of the flesh color of the 15 fish of each test division measured by a spectrometer. After the measurement, the fish flesh was frozen for preservation for 1 month. After being thawed, the fish flesh of the fish of each test division was analyzed in terms of the content of each carotenoid compound. Table 14 shows the average value of the 15 fish of each test division.

The fish flesh of the synthesized product division exhibited a reddish orange color close to a red color, whereas the fish flesh of the fermented product division exhibited a mild and natural looking reddish orange color.

TABLE 12

| | Content in the feed (mg/kg) | |
|---|---|---|
| Carotenoid compound | Feed with fermented product | Feed with synthetic product |
| Astaxanthin | 72.7 | 70.3 |
| Phoenicoxanthin | 43.7 | 0.1 or less |
| Canthaxanthin | 15.3 | 0.1 or less |
| Adonixanthin | 4.5 | 0.1 or less |
| Asteroidenone | 1.9 | 0.1 or less |
| β-carotin | 1.9 | 0.1 or less |
| Equinenone | 3.5 | 0.1 or less |
| 3-hydroxyequinenone | 1.2 | 0.1 or less |

TABLE 13

| | Fermented product division | Synthetic product division |
|---|---|---|
| Fish weight (g) | 1,779 | 1,784 |
| Value by spectrometer analysis | | |
| L* value (luminance) | 51.5 | 50.8 |
| a* value (chroma red) | 22.8 | 23.7 |
| b* value (chroma yellow) | 26.6 | 25.5 |
| a*/b* | 0.86 | 0.93 |

TABLE 14

| | Fermented product division | | Synthetic product division |
|---|---|---|---|
| Carotenoid compound | Content in fish flesh (mg/kg) | Ratio to astaxanthin (%) | Content in fish flesh (mg/kg) |
| Astaxanthin | 4.6 | 100 | 7.2 |
| Phoenicoxanthin | 2.1 | 45.7 | 0.02 or less |
| Canthaxanthin | 0.3 | 6.5 | 0.02 or less |
| Adonixanthin | 0.3 | 6.5 | 0.02 or less |
| Asteroidenone | 0.1 | 2.2 | 0.02 or less |

TABLE 14-continued

|  | Fermented product division | | Synthetic product division Content in fish flesh (mg/kg) |
|---|---|---|---|
| Carotenoid compound | Content in fish flesh (mg/kg) | Ratio to astaxanthin (%) | |
| β-carotin | 0.02 or less | 0.5 or less | 0.02 or less |
| Equinenone | 0.02 or less | 0.5 or less | 0.02 or less |
| 3-hydroxyequinenone | 0.02 or less | 0.5 or less | 0.02 or less |

INDUSTRIAL APPLICABILITY

As described above, the present invention provides a feed including a carotenoid colorant which includes at least astaxanthin, phoenicoxanthin, canthaxanthin and adonixanthin. A feed according to the present invention is usable for producing a salmon having a mild and natural looking reddish orange flesh color.

The invention claimed is:

1. A method for producing a salmon having a mild reddish orange flesh color, comprising cultivating the salmon with a feed comprising a carotenoid colorant mixed therein, the carotenoid colorant comprising at least astaxanthin, phoenicoxanthin, canthaxanthin and adonixanthin, wherein the product salmon contains astaxanthin, phoenicoxanthin, canthaxanthin and adonixanthin in fish flesh thereof, the content of astaxanthin in the feed is 20 to 100 mg/kg, the content of phoenicoxanthin in the feed is 5 to 80 mg/kg, the content of adonixanthin in the feed 1.0 to 40 mg/kg, the ratio of the content of adonixanthin with respect to the content of astaxanthin in the fish flesh of the produced salmon is 2.0 to 40%, and the ratio of the content of phoenicoxanthin with respect to the content of astaxanthin in the fish flesh of the produced salmon is 10 to 80%.

2. The method according to claim 1, wherein a content of canthaxanthin in the feed is 0.5 to 25 mg/kg.

3. The method according to claim 1, wherein a ratio of the content of canthaxanthin with respect to the content of astaxanthin in the fish flesh of the produced salmon is 0.5 to 20%.

4. The method according to claim 1, wherein the carotenoid colorant in the feed comprises a naturally occurring carotenoid colorant.

5. The method according to claim 1, wherein the carotenoid colorant in the feed comprises a naturally occurring carotenoid colorant and a chemically synthesized carotenoid colorant.

6. The method according to claim 4, wherein the naturally occurring carotenoid colorant included in the carotenoid colorant is produced by fermentation of bacteria.

7. The method according to claim 6, wherein the bacteria belong to the *Paracoccus* genus.

8. The method according to claim 6, wherein the bacteria contain a DNA corresponding to 16S ribosomal RNA, the DNA containing a base sequence which is at least 98% homologous to the base sequence represented by SEQ ID NO: 1.

9. The method according to claim 8, wherein the bacteria are E-396 strain (FERM BP-4283) or a mutant thereof.

10. The method according to claim 8, wherein the salmon is at least one selected from the group consisting of *Salmo salar, Oncorhynchus mykiss, Oncorhynchus kisutch, Oncorhynchus tshawytscha, Oncorhynchus nerka, Oncorhynchus gorbuscha, Oncorhynchus masou, Oncorhynchus keta, Oncorhynchus masou macrostomus*, and *Salmo trutta*.

11. The method according to claim 10, wherein the salmon is at least one selected from the group consisting of *Salmo salar, Oncorhynchus mykiss, Oncorhynchus kisutch*, and *Oncorhynchus tshawytscha*.

* * * * *

SEQUENCE LISTING

<160> NUMBER OF SEQ ID NOS: 1

<210> SEQ ID NO 1
<211> LENGTH: 1452
<212> TYPE: DNA
<213> ORGANISM: Paracoccus carotinifaciens
<220> FEATURE:
<221> NAME/KEY: misc_feature
<222> LOCATION: (1350)..(1350)
<223> OTHER INFORMATION: n is a, c, g, or t

<400> SEQUENCE: 1

```
agtttgatcc tggctcagaa cgaacgctgg cggcaggctt aacacatgca agtcgagcga      60
gaccttcggg tctagcggcg gacgggtgag taacgcgtgg gaacgtgccc ttctctacgg     120
aatagccccg ggaaactggg agtaataccg tatacgccct ttgggggaaa gatttatcgg     180
agaaggatcg gcccgcgttg gattaggtag ttggtggggt aatggcccac caagccgacg     240
atccatagct ggtttgagag gatgatcagc cacactggga ctgagacacg gcccagactc     300
ctacgggagg cagcagtggg gaatcttaga caatgggggc aaccctgatc tagccatgcc     360
gcgtgagtga tgaaggcctt agggttgtaa agctctttca gctgggaaga taatgacggt     420
accagcagaa gaagccccgg ctaactccgt gccagcagcc gcggtaatac ggaggggggct     480 agcgttgttc ggaattactg ggcgtaaagc gcacgtaggc ggactggaaa gtcagaggtg     540
aaatcccagg gctcaacctt ggaactgcct ttgaaactat cagtctggag ttcgagagag     600
gtgagtggaa ttccgagtgt agaggtgaaa ttcgtagata ttcggaggaa caccagtggc     660
gaaggcggct cactggctcg atactgacgc tgaggtgcga aagcgtgggg agcaaacagg     720
attagatacc ctggtagtcc acgccgtaaa cgatgaatgc cagacgtcgg caagcatgct     780
tgtcggtgtc acacctaacg gattaagcat tccgcctggg gagtacggtc gcaagattaa     840
aactcaaagg aattgacggg ggcccgcaca agcggtggag catgtggttt aattcgaagc     900
aacgcgcaga accttaccaa cccttgacat ggcaggaccg ctggagagat tcagctttct     960
cgtaagagac ctgcacacag gtgctgcatg gctgtcgtca gctcgtgtcg tgagatgttc    1020
ggttaagtcc ggcaacgagc gcaacccacg tccctagttg ccagcaattc agttgggaac    1080
tctatggaaa ctgccgatga taagtcggag gaaggtgtgg atgacgtcaa gtcctcatgg    1140
gccttacggg ttgggctaca cacgtgctac aatggtggtg acagtgggtt aatccccaaa    1200
agccatctca gttcggattg tcctctgcaa ctcgagggca tgaagttgga atcgctagta    1260
atcgcggaac agcatgccgc ggtgaatacg ttcccggcc ttgtacacac cgcccgtcac    1320
accatgggag ttggttctac ccgacgacgn tgcgctaacc ttcgggggc aggcggccac    1380 ggtaggatca gcgactgggg tgaagtcgta acaaggtagc cgtaggggaa cctgcggctg    1440
gatcaccttc tt                                                       1452
```